US006631922B2

(12) United States Patent
Hess et al.

(10) Patent No.: US 6,631,922 B2
(45) Date of Patent: Oct. 14, 2003

(54) APPARATUS AND METHOD FOR AIRBAG CUSHION MODULARIZATION

(75) Inventors: Travis B. Hess, West Farr West, UT (US); Kurt E. Kottke, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/902,175

(22) Filed: Jul. 10, 2001

(65) Prior Publication Data

US 2003/0011175 A1 Jan. 16, 2003

(51) Int. Cl.⁷ .............................................. B60B 21/22
(52) U.S. Cl. ................................................... 280/730.2
(58) Field of Search .......................... 280/730.2, 730.1, 280/743.2, 743.1, 733

(56) References Cited

U.S. PATENT DOCUMENTS

| 6,073,961 | A  | * | 6/2000 | Bailey et al. | ............ | 280/730.2 |
| 6,237,941 | B1 | * | 5/2001 | Bailey et al. | ............ | 280/730.2 |
| 6,237,943 | B1 | * | 5/2001 | Brown et al. | ............ | 280/730.2 |
| 6,474,681 | B2 | * | 11/2002 | Peer et al.  | ............ | 280/730.2 |

FOREIGN PATENT DOCUMENTS

GB        2327066        7/1997

* cited by examiner

*Primary Examiner*—Paul N. Dickson
*Assistant Examiner*—Faye M. Fleming
(74) *Attorney, Agent, or Firm*—Sally J. Brown; James D. Erickson (57) ABSTRACT

A system and method for enhancing the interchangeability, cost effectiveness, and protective capacity of side impact, inflatable curtains is disclosed. An inflatable curtain module may have multiple cushions attached together by a separately manufactured inflatable tension coupling. The tension coupling may be attached to the cushions prior to folding of the cushions by, for example, sewing one end of the tension coupling to each cushion. The tension coupling may also be attached to the cushions after the cushions have been folded. The cushions may each have one or more tabs positioned to extend inward toward the tension coupling; the tabs may protrude from the folded cushions so that the tension coupling can be attached to the tabs after the cushions have been folded. The tension coupling may have a plurality of expanses configured to be attached between the cushions parallel to each other, and a flexible central portion connecting a pair of expanses to provide a barrier against occupant excursion while still permitting compaction of the tension coupling. Several combinations of compaction methods may be used to compact the cushions and the tension coupling. The tension coupling may alternatively have an array of holes at each end configured to be aligned with an array of holes on each cushion, so that one or more attachment mechanisms such as laces can be inserted through the holes to provide attachment.

32 Claims, 8 Drawing Sheets

APPARATUS AND METHOD FOR AIRBAG CUSHION MODULARIZATION

BACKGROUND OF THE INVENTION

1. The Field of the Invention

The present invention relates to vehicular safety. More specifically, the present invention relates to a novel apparatus and method for enhancing the flexibility and cost effectiveness of airbag systems without sacrificing protective capability.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield. Side impact airbags, known as inflatable curtains, have also been developed in response to the need for protection from impacts in a lateral direction, or against the side of the vehicle.

However, despite their enormous lifesaving potential, the use and effectiveness of known side impact airbags have been somewhat limited by a number of problems. One such problem is the speed with which inflation gases must fill the cushion to provide side impact protection.

Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion. If multiple cushions are fed by a single inflator positioned either fore or aft of the cushions, an especially long gas flow path exists between the inflator and the cushion furthest from the inflator. Thus, the outermost extents of the inflatable curtain may receive insufficient inflation gas pressure to inflate to the optimal protective pressure.

Furthermore, the bulk and expense of known inflatable curtains limits the extent to which they can be utilized in compact and economy vehicles. Since each vehicle has a unique interior configuration, different inflatable curtain modules must often be designed for installation in each model. Manufacturing and inventory costs are increased by the necessary customization, particularly in the case of curtain modules in which multiple cushions are to be integrally formed with a single process. Such curtain modules are also inconvenient to ship.

Additionally, some known side impact systems simply are not sturdy enough to adequately protect vehicle occupants. Known cushions may move too much in response to the impact velocity of the vehicle occupant, particularly if there is no window or other surface to provide support for the cushion. Vehicle occupants may thus be injured despite the presence of the airbag.

If the curtain module is designed to provide rollover protection, another danger exists. Particularly in the case of more compact cushions, ahead or limb of an occupant may extend through an opening between or beside the cushion or cushions of the inflatable curtain module, and may then extend outside the vehicle during the rollover. "Occupant excursion" during rollovers is a common cause of automotive fatality, particularly in the case of vehicle occupants that are not wearing a seat belt during the rollover. Occupants can be jostled around considerably within the vehicle during a rollover; consequently, the positioning of cushions directly beside the vehicle seats may not be sufficient to protect against occupant excursion.

Accordingly, a need exists for an apparatus and method capable of enhancing the interchangeability of inflatable curtain modules. Furthermore, a need exists for an apparatus and method capable of supporting airbag cushions during impact to limit the degree to which such cushions are able to move from their deployed position. Yet further, a need exists for an apparatus and method capable of providing a greater degree of protection against occupant excursion, particularly during a vehicle rollover. Still further, a need exists for an apparatus and method capable of decreasing the cost, bulk, shipping expense, and/or installation expense of inflatable curtain modules.

BRIEF SUMMARY OF THE INVENTION

The apparatus and method of the present invention have been developed in response to the present state of the art, and in particular, in response to the problems and needs in the art that have not yet been fully solved by currently available inflatable curtains. Thus, it is an overall purpose of the present invention to provide an apparatus and method for enhancing the protective capability, interchangeability, flexibility, and economy of inflatable curtain modules.

According to one configuration, an inflatable curtain module according to the present invention may have two cushions configured to activate to shield vehicle occupants from impact against one or more lateral surface of the vehicle, such as doors and windows. For example, one cushion may be disposed beside a front seat, and the other cushion may be disposed alongside a rear seat. If desired, the cushions may be fed by different inflators, so that inflation gases do not need to travel through one cushion to reach the other. The cushions may be connected together by a tension coupling configured to transmit tension between the cushions and to act as a barrier to occupant excursion.

Each of the cushions may have a top edge and a bottom edge positioned on either side of a protection zone configured to hold the inflation gases. Furthermore, the top and bottom edges may be connected by interior longitudinal edges positioned toward the tension coupling and exterior longitudinal edges positioned away from the tension coupling.

According to one embodiment, the tension coupling may be affixed to the cushions prior to compaction of the cushions. The tension coupling may be affixed to the cushions by, for example, sewing each end of the tension coupling to an interior longitudinal edge of one of the cushions. The cushions and the tension coupling may then simply be compacted together, by folding, rolling, or the like. Thus, when the cushions deploy, the tension coupling may simply deploy in the same fashion.

In operation, the tension coupling may operate in conjunction with tethers that attach each cushion to the vehicle. When the cushions inflate, the cushions may shorten horizontally so that they pull tightly against the tethers. The tension coupling may then transmit the tension from the tethers between the cushions so that both cushions can be held tightly in the proper position against the lateral surface of the vehicle. Additionally, the tension coupling may provide a barrier between the cushions tending to keep the occupants inside the vehicle during a vehicle rollover.

In the alternative, the tension coupling may be configured to be attached to the cushions after the cushions are folded so that the inflatable curtain module can be constructed and shipped in a modular fashion. For example, according to one alternative embodiment, the tension coupling may have a compactible configuration that permits independent compaction and attachment to the cushions after the cushions have been compacted.

More specifically, the tension coupling may have a first expanse and a second expanse, each of which is configured to be attached to both cushions. The first and second expanses may be displaced somewhat from each other, and may be connected by an central portion capable of keeping body parts of vehicle occupants from extending between the first and second expanses after the curtain module has deployed. The central portion may be compacted, for example, through "accordion type" or "zig-zag" folding (a folding pattern with adjacent folds in opposite directions) or rolling.

Each of the cushions may have one or more tabs protruding from the interior longitudinal edge. If desired, each cushion may have two tabs: one positioned at a location suitable for attachment to one of the expanses of the tension coupling. The tabs may protrude such that they remain exposed after compaction of the cushions.

Thus, attachment of the tension coupling to the cushions may be relatively easily accomplished after the cushions have been compacted by compacting the central portion to bring the first and second expanses closer together and then attaching each of the expanses between one pair of tabs, so that each expanse spans the gap between the cushions. Such attachment enables the cushions to be folded separately and, if desired, sent to the vehicle manufacturer in unattached form together with the tension coupling.

Attachment of the expanses to the tabs may be accomplished through the use of a wide variety of attachment mechanisms. For example, rigid mechanical fasteners, such as clamps, snaps, hooks, locking rings, screws, bolts, nuts, rivets, and tacks, may be used. If desired, each tab may have a hole positioned to align with a corresponding hole of the tension coupling so that a rigid mechanical fastener may be inserted through both holes and locked into place. Alternatively, the tabs may be sewn to the tension coupling. As yet another alternative, the tabs may be welded to the tension coupling through a method such as ultrasonic or RF welding.

The cushions may be folded in a variety of different ways, including accordion type folding and rolling. If desired, the tension coupling may be folded in the same manner to facilitate proper deployment. For example, if an accordion type fold is used for the cushions, the tension coupling may also have an accordion type fold, and may have the same number of folds as the portion of each cushion between the tabs. If the cushions are compacted by rolling, the tension coupling may also be rolled, and may have the same number of rolls as the portion of each cushion between the tabs.

In the alternative, the tension coupling may be compacted in a manner different from that used to compact the cushions. For example, an accordion folded tension coupling may be used in combination with rolled cushions, or a rolled tension coupling may be used in combination with accordion folded cushions. As yet another alternative, the tension coupling need not be compacted in any orderly fashion, but may simply be compressed to be stowed between the cushions.

In addition to the tabs, other methods may be used to attach a tension coupling between two cushions after the cushions have been folded. For example, each cushion may have an array of cushion holes formed proximate the interior longitudinal edge. The tension coupling may have two corresponding arrays of coupling holes. The holes of each array may be spaced apart such that the holes of each array of coupling holes can be aligned with the holes of an array of cushion holes.

After each array of coupling holes has been aligned with an array of cushion holes, some type of attachment mechanism may be utilized to attach each pair of aligned hole arrays. For example, a plurality of rigid mechanical fasteners may be inserted through each pair of aligned holes and locked into place. In the alternative, a lace may be inserted through all of the holes of each aligned pair of arrays so that the lace effectively interlocks with the cushion and the tension coupling to provide attachment.

The holes of each array may also be spaced apart to align with each other after compaction so that the lace can be inserted through all of the holes of each pair of arrays with one comparatively simple motion. Each lace may then be locked into place through the use of a stopper, such as a locking clamp.

Through the system and method of the present invention, an inflatable curtain module may be made with a plurality of interchangeable components, so that manufacturing, shipping, and storage costs for the airbag as a whole are reduced. The system and method disclosed herein may enhance the effectiveness of the inflatable curtain module through the use of the tension coupling to transmit tension between the cushions, thereby keeping the cushions in a highly protective location. Furthermore, the system and method of the present invention may more effectively prevent occupant excursion during vehicle rollovers by blocking the space between cushions with the tension coupling.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 8, is not intended to limit the scope of the invention, as claimed, but is merely representative of presently preferred embodiments of the invention.

The present invention utilizes several principles to enhance the operation and cost effectiveness of inflatable curtain modules. One such principle is that of modular construction. In certain configurations, the present invention enables cushions to be produced and compacted separately, so that one set of manufacturing and compacting equipment can be used to produce cushions for use in several different vehicle models. The cushions can then be positioned and connected in a manner selected by the vehicle manufacturer.

Additionally, the present invention utilizes tension transmittal to provide support for cushions. More specifically, multiple cushions may be connected together so that tension can be transmitted from the vehicle frame through the cushions to keep the cushions in place. Such tension can be achieved even in the case of cushions that have been produced and installed in a modular fashion.

Furthermore, the present invention provides a system and method by which an expandable barrier to occupant excursion can be created without consuming inflation gas. Such a barrier may be created between cushions to keep any part of the vehicle occupants from extending out from the vehicle interior. The manner in which these and other principles operate in conjunction with the present invention will be shown and described in greater detail in connection with the following figures.

Figure 1:
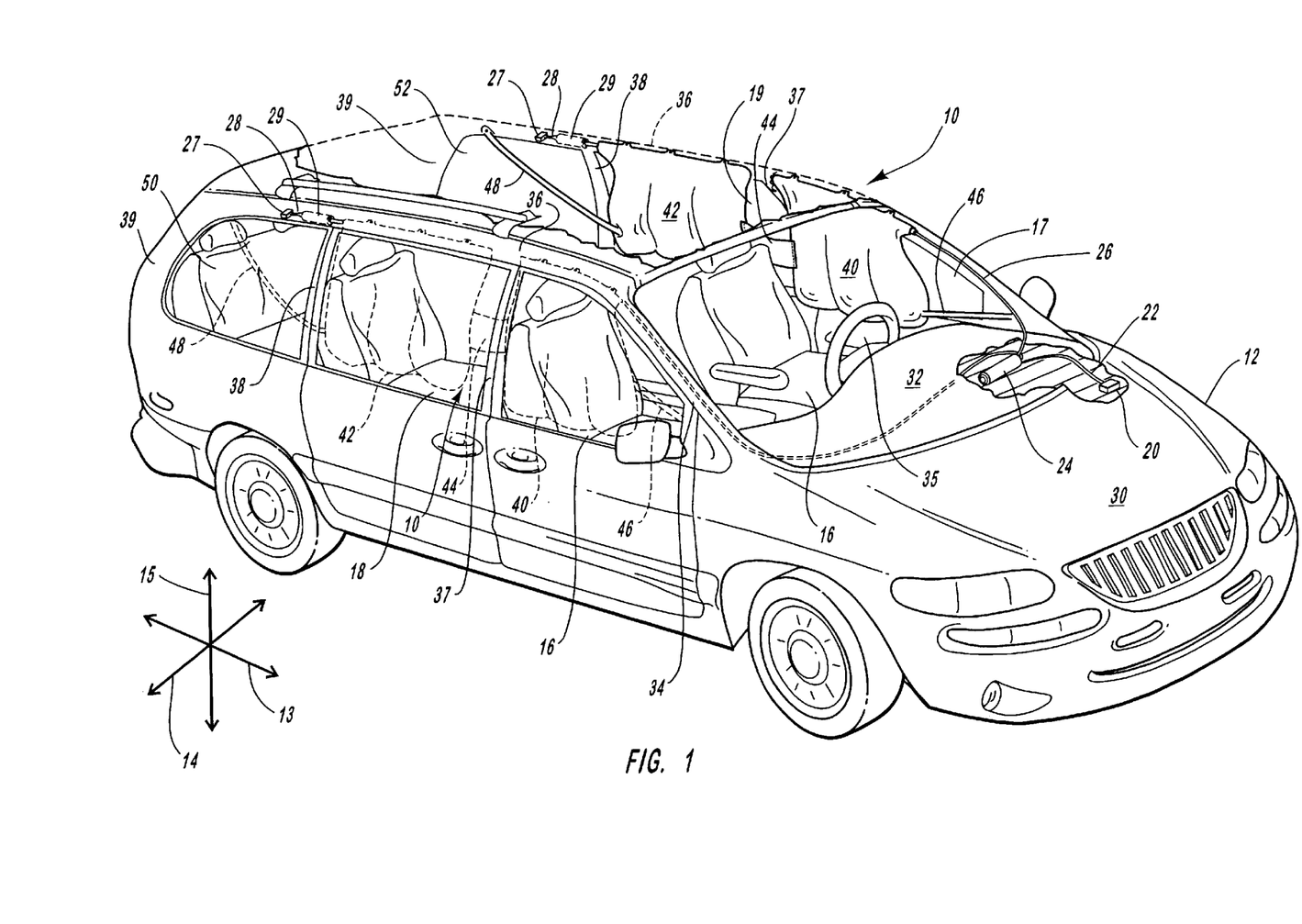
FIG. 1 is a perspective view of a vehicle incorporating one embodiment an inflatable curtain module with tension-coupled, modular cushions.

Referring to FIG. 1, an inflatable curtain module 10 according to one possible embodiment the invention is shown installed in a vehicle 12. The inflatable curtain module may form part of an airbag system configured to protect one or more vehicle occupants against lateral impact through the formation of a protective "curtain" beside the occupants.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such inflatable curtain modules 10 may be used: one for the driver's side of the vehicle 12, and the other for the passenger's side.

One or more accelerometers 20 or other similar impact sensing devices detect sudden lateral acceleration (or deceleration) of the vehicle 12 and transmit electric signals via electric lines 22 to one or more sources 24 of pressurized gas, or inflators 24. FIG. 1 shows only one inflator 24 configured to inflate the front portions of both of the inflatable curtain modules 10. Additional accelerometers 27, electric lines 28, and inflators 29 may be utilized to inflate the rear portions of both cushions 10. FIG. 1 shows separate accelerometers 27, electric lines 28, and inflators 29 in use to inflate the rear portion of each inflatable curtain module 10. Those of skill in the art will recognize that a wide variety of inflator configurations may be used to inflate the inflatable curtains 10.

The inflators 24, 29 may each take the form of a hollow pressure vessel containing a chemically reactive material and/or compressed gas that can be activated or released upon application of electricity to provide an outflow of inflation gases. In the exemplary configuration of FIG. 1, the inflator 24 is connected to the inflatable curtain modules 10 through the use of a pair of gas guides 26 configured to convey the inflation gases from the inflator 24 to the inflatable curtain modules 10. Conversely, the inflators 29 are partially enveloped within the inflatable curtain modules 10 so that inflation gases exiting the inflators flow directly into the inflatable curtain modules 10. The inflators 24, 29 may operate with such rapidity that, before the vehicle 12 has fully reacted to the impact, the inflatable curtain modules 10 have inflated to protect vehicle occupants from impact.

The accelerometer 20 and inflator 24 may be stowed within an engine compartment 30 or dashboard 32 of the vehicle 12, as shown in FIG. 1. In such a configuration, the gas guides 26 may be disposed along the A pillars 34 of the vehicle 12, on either side of the windshield 35, to reach the inflatable curtain modules 10. The accelerometers 27 and inflators 29 may be disposed along roof rails 36 of the vehicle, proximate the location at which the inflatable curtain modules 10 are mounted. If desired, in place of the single inflator 24, multiple inflators may be attached to the roof rail 36 or the A pillars 34 to inflate the front portions of the inflatable curtain modules 10. Depending on the model of the vehicle 12 and the desired configuration of the inflatable curtains, airbag components may also be disposed along the B pillars 37, C pillars 38, and/or D pillars 39.

As depicted in FIG. 1, each of the inflatable curtain modules 10 is installed along one of the roof rails 36. The inflatable curtain modules 10 shown in FIG. 1 are configured to protect not only occupants of the front seats 16, but those of the rear seats 18 as well. Thus, each inflatable curtain module 10 may have a first cushion 40 configured to inflate between the front seats 16 and one of the front doors 17, and a second cushion 42 configured to inflate between the rear seats 18 and one of the rear doors 19. A "cushion" may be defined as a protective member designed to be interposed between an occupant and some part of a vehicle.

The first and second cushions 40, 42 of each inflatable curtain module 10 may be attached together through the use of a tension coupling 44 positioned between the cushions 40, 42. A "tension coupling" is simply any member connected between two cushions to transmit tension between the cushions. The tension couplings 44 may be longitudinally positioned between the front seats 16 and the rear seats 18; consequently, the tension couplings 44 may not receive lateral impact in a normal accident scenario; however, they may serve as barriers to occupant excursion from the vehicle, particularly in rollover situations.

Each of the inflatable curtain modules 10 may have a front tether 46 attached to the A pillar 34 and a rear tether 48 attached to the roof rail 36 to exert tension on the inflatable curtain modules 10 to keep them in place during inflation and impact. Those of skill in the art will recognize that the tethers 46, 48 may also be attached to other parts of the vehicle 12, such as the B pillars 37, C pillars 38, and/or D pillars 39. The tethers 46, 48 may be constructed of standard seatbelt webbing or the like.

Although each inflatable curtain module 10 in FIG. 1 has two cushions 40, 42, the invention encompasses the use of inflatable curtain modules with any number of protection zones. Thus, if desired, the cushions 42 and tension couplings 44 may be omitted to leave only the cushions 40. Alternatively, each of the inflatable curtain modules 10 may be extended to have one or more cushions positioned to protect occupants of extra seats 50 behind the rear seats 18 from impact against third lateral surfaces 52 of the vehicle 12.

In the embodiment depicted in FIG. 1, the tension coupling 44 may be attached to the cushions 40, 42 prior to compaction of the cushions 40, 42, and compacted together with the cushions 40, 42. In this application, "compaction" refers to any method of compressing an cushion into a form that can be stowed in a vehicle for rapid deployment. "Compaction" thus includes rolling as well as folding, with successive inward folds or alternating, "accordion style" folds. The attachment of the tension coupling 44 to the cushions 40, 42 is depicted in greater detail in FIG. 2.

Figure 2:
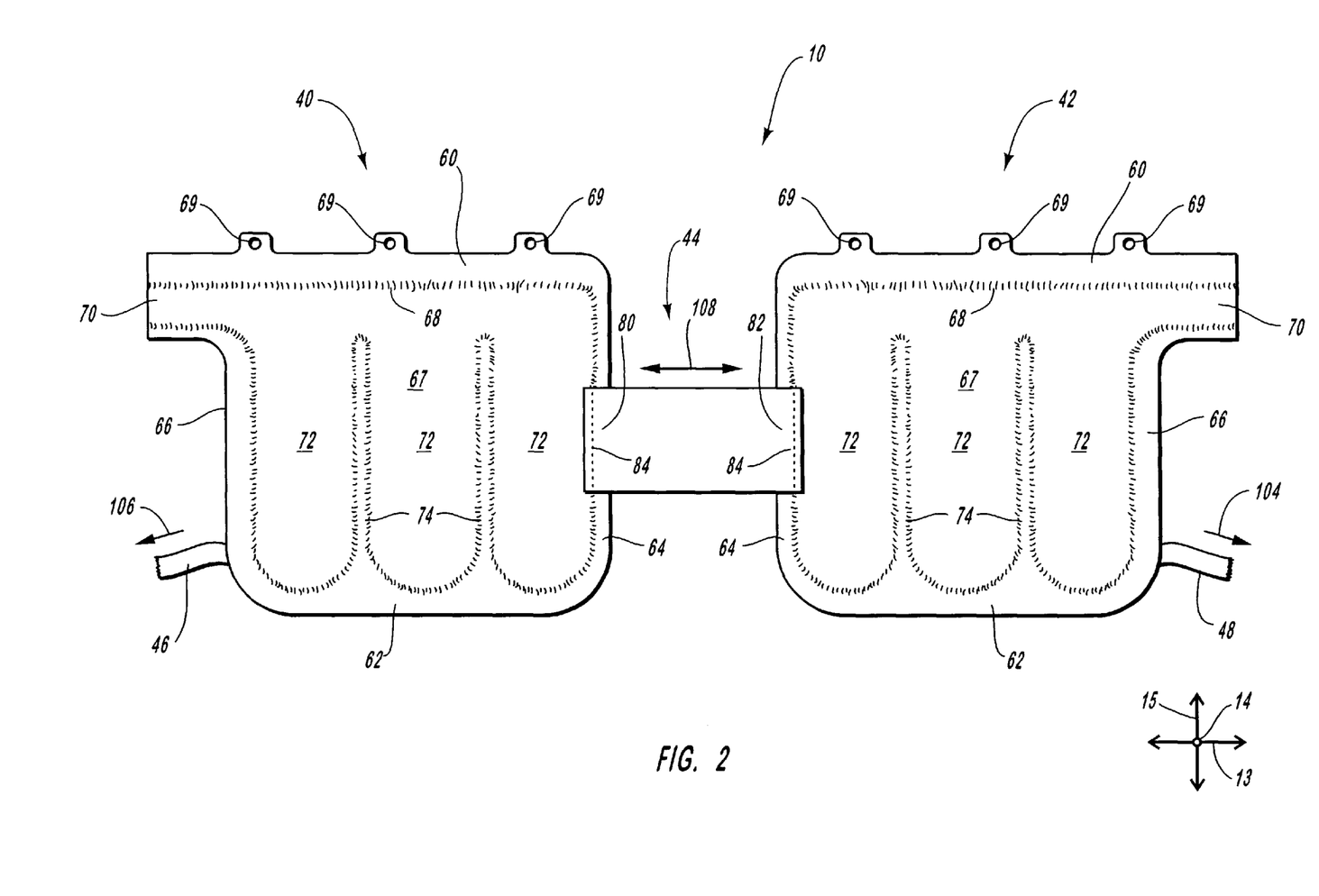
FIG. 2 is a side elevation view of the inflatable curtain module of claim 1, showing a tension coupling sewn to each of the cushions.

Referring to FIG. 2, a side view of the first cushion 40, the second cushion 42, and the tension coupling 44 is shown; the vehicle 12, inflator 29, and other components have been omitted for clarity. The cushions 40, 42 may be constructed of a flexible material such as a fabric or polymer. Each of the cushions 40, 42 may have a top edge 60 adjoining the roof rail 36 and a bottom edge 62 that will be compressed toward the top edge 60 when the cushion 40 or 42 is compacted. When the cushion 40 or 42 deploys, the bottom edge 62 then extends away from the top edge 60. Each of the cushions 40, 42 may also have an interior longitudinal edge 64 and an exterior longitudinal edge 66, both of which extend between the top edge 60 and the bottom edge 62.

Each cushion 40, 42 may, for example, be constructed of two symmetrical sheets of a flexible material such as a fabric or polymer. The cushions 40, 42 may be made using "lay flat" construction, in which each cushion 40, 42 is constructed from one or more sheets of material laid together and sewn at the edges to trap inflation gases. Thus, each of the cushions 40, 42 may have a protection zone 67 within the perimeter formed by the top edge 60, the bottom edge 62, the interior longitudinal edge 64, and the exterior longitudinal edge 66. The protection zone 67 may be substantially sealed by a peripheral seam 68 that separates the protection zone 67 from the edges 60, 62, 64, 66. A "protection zone" may be defined as the portion of each cushion 40, 42 that is designed to directly contact the vehicle occupant.

The peripheral seam 68 may be created through any attachment method. Some examples of attachment methods that can be used include sewing, conventional or one-piece weaving, thermal, RF, or ultrasonic welding, chemical or adhesive bonding, and mechanical fastening.

The top edge 60 of each cushion 40, 42 need not be directly attached to the roof rails 36, but may instead be attached to the roof rail 36 via a plurality of attachment tabs 69. Any method, such as mechanical fastening, welding, bonding, or the like may be used to attach the attachment tabs 69 to one of the roof rails 36. For example, the attachment tabs 69 may be affixed to the roof rail 36 through the use of bolts or other mechanical fasteners.

Each of the cushions 40, 42 may have a gas inlet port 70 through which the cushion 40, 42 can receive inflation gas. If the inflator configuration of FIG. 1 is used, the inlet port 70 of the second cushion 42 may directly contain a portion of the inflator 29, while the inlet port 70 of the first cushion 40 is connected to the inflator 24 via the gas guide 26.

The protection zone 67 of each cushion 40, 42 may have a plurality of chambers 72 designed to contain the inflation gas; the chambers 72 may serve to ensure that the cushions 40, 42 do not intrude too far into the vehicle 12 to cause injury during deployment. Additionally, the chambers 72 may shorten in the longitudinal direction 13 as the inflatable curtain module 10 deploys, thereby enhancing the level of tension that can be provided by the tethers 46, 48. The chambers 72 may be separated from each other by chamber dividers 74, which may take the form of sewn, woven, bonded, and/or welded seams.

The tension coupling 44 may have a first end 80 connected to the first cushion 40 and a second end 82 connected to the second cushion 42. The first and second ends 80, 82 may be attached to the cushions 40, 42 via an attachment mechanism 84. The attachment mechanism 84 may utilize any known method or combination of methods. For example, the attachment mechanism 84 may utilize sewing, thermal, RF, or ultrasonic welding, chemical or adhesive bonding, and/or mechanical fastening. Thus, the attachment mechanism 84 may consist of a sewn interface, a welded interface, a bonded interface, and/or any mechanical fastener or fasteners.

In FIG. 2, the attachment mechanism 84 comprises a sewn interface 84 at each of the first and second ends 80, 82. If desired, the sewn interfaces 84 may each be positioned along one of the interior longitudinal edges 64 to avoid puncturing the protection zones 67 to carry out the sewing process. In the alternative, the first and second ends 80, 82 may be sewn to the protection zones 67 directly. In such a case, it may be desirable to apply an adhesive or other mechanism to the sewn interfaces 84 to avoid inflation gas leakage through the sewn interfaces 84.

In operation, the tension coupling 44 may operate to convey tension between the first and second cushions 40, 42. More specifically, when the inflatable curtain module 10 deploys, the front tether 46 may exert a forward tension 104 on the first cushion 40. Similarly, the rear tether 48 may exert a rearward tension 106 on the second cushion 42. The tension coupling 44 may convey a connecting tension 108 between the cushions 40, 42. Consequently, the tethers 46, 48 and the tension coupling 44 are able to create a complete tension path to anchor the inflatable curtain module 10 to the vehicle 12 at two positions. Thus, it is possible for the cushions 40, 42 to be stretched somewhat tightly in the longitudinal direction 13 when they reach their deployed positions.

The tension created by the tethers 46, 48 and the tension coupling 44 tends to hold the cushions 40, 42 in the space between the seats 16, 18 and the doors 17, 19. Thus, during inflation of the inflatable curtain module 10, the cushions 40, 42 are less likely to inflate inward, into the vehicle 12, to injure vehicle occupants. Additionally, when vehicle occupants collide with the cushions 40, 42, the cushions 40, 42 are less likely to deflect outward far enough to lose their protective capability. During a rollover, the tension on the inflatable curtain modules 10 allows the inflatable curtain modules 10 to form firm barriers across which limbs of vehicle occupants cannot extend, even if the windows of the vehicle 12 are open during the rollover.

Moreover, the position of the tension coupling 44 between the cushions 40, 42 provides additional protection against occupant excursion. Even though the cushions 40, 42 may be positioned between the most likely occupant locations and the doors 17, 19, a vehicle occupant may be unbelted, leaning forward, or otherwise not in the usual position with respect to the inflatable curtain module 10 during impact. In the absence of structure between the cushions 40, 42, a part of the vehicle occupant may extend between the cushions 40, 42, and may be subject to severe injury in a rollover situation. The tension on the tension coupling 44 ensures that the tension coupling 44 is able to act as a barrier to occupant excursion.

The tension coupling 44 need not cover the entire space between the cushions 40, 42 to protect against excursion. Rather, the tension coupling 44 must only cover an area large enough leave open spaces too small to have a substantial likelihood of permitting the excursion of a body part of an occupant. As shown in FIG. 2, the tension coupling 44 is not so broad as to cover the entire gap between the cushions 40, 42. However, the remaining spaces between the cushions 40, 42 are small enough that there is little likelihood that any body part will extend through them.

As stated previously, the tension coupling 44 may be affixed to the cushions 40, 42 before the cushions are folded. It may even be possible to attach the tension coupling 44 of FIG. 2 to the cushions 40, 42 after compaction of the cushions 40, 42, depending on the type of attachment mechanism 84 chosen and the tightness of the compaction.

To carry out attachment prior to compaction, the cushions 40, 42 may first be laid flat and spaced apart at approximately the spacing at which they will deploy, and then the tension coupling may be laid on top of the cushions 40, 42 so that the first and second ends 80, 82 at least partially overlap the interior longitudinal edges 64. The selected attachment mechanism 84, such as the sewn interfaces 84 of FIG. 2, may then be applied to affix the first and second ends 80, 82 to the cushions 40, 42.

After the tension coupling 44 has been attached, the cushions 40, 42 may be compacted through any known process. The compaction process may, for example, be rolling or accordion type folding, with alternating adjacent folds. Regardless of the selected compaction method, the tension coupling 44 may be compacted together with the cushions 40, 42. Thus, the tension coupling 44 may be, for example, accordion folded or rolled along with the cushions 40, 42. The inflatable curtain module 10 may then be stowed proximate one of the roof rails 36, as shown in FIG. 1. Inflation of the cushions 40, 42 then causes the tension coupling 44 to deploy in its proper location by virtue of its attachment to the cushions 40, 42.

The invention is not limited to inflatable curtain modules having two cushions; rather, an inflatable curtain module may have more than two cushions. Such an inflatable curtain module may utilize only a single tension coupling to connect two adjacent curtains, or may have multiple tension couplings. For example, an inflatable curtain module may have tethers attached only to the cushions at the front and rear of the vehicle, and may have tension couplings attaching each pair of adjacent cushions to form one complete tension path through the entire curtain module. Those of skill in the art will recognize that cushions and tension couplings may be relatively positioned and connected in a wide variety of ways according to the invention.

An inflatable curtain module may be embodied in alternative forms designed to permit attachment of the tension coupling to the cushions after the cushions have been folded. Such embodiments may provide advantages in that the cushions can be folded separately, thereby decreasing the size of the required folding equipment. If desired, the cushions and the tension coupling may then be shipped in unattached form to the vehicle manufacturer, which can then determine the stage of the installation process at which the attachment will be carried out. Such embodiments are shown and described in connection with FIGS. 3 through 8.

Figure 3:
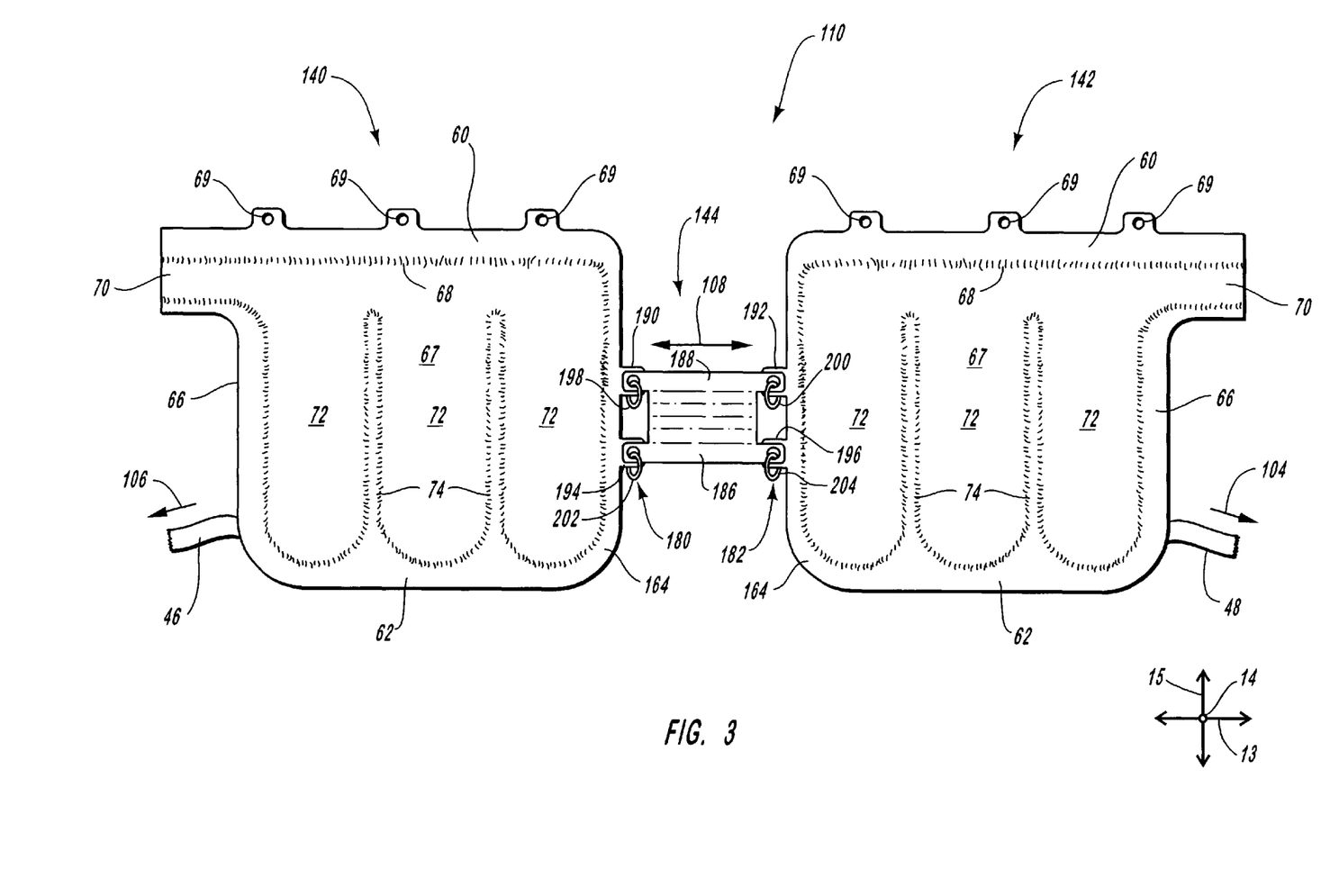
FIG. 3 is a side elevation view of an alternative embodiment of an inflatable curtain module according to the invention, with a tension coupling attached to each cushion through the use of tabs extending from the interior lateral surface of each cushion.

Referring to FIG. 3, a side view of an alternative embodiment of an inflatable curtain module 110 according to the invention is shown. The inflatable curtain module 110 may have a first cushion 140, a second cushion 142, and a tension coupling 144. The cushions 140, 142 may be configured in a manner similar to the cushions 40, 42, with the exception of the interior lateral surfaces 164. The interior lateral surfaces 164 may be specially configured to provide for attachment of the tension coupling 144 to the cushions 140, 142 after the cushions 140, 142 have been folded, as will be described subsequently.

The tension coupling 144 may also be configured somewhat differently from the tension coupling 44 of FIGS. 1 and 2. The tension coupling 144 may have a first end 180 configured to be attached to the first cushion 40 and a second end 182 configured to be attached to the second cushion 42. The tension coupling 144 may include a first expanse 184 and a second expanse 186, each of which extends between the first and second ends 180, 182. The expanses 184, 186 may be displaced from each other somewhat in the transverse direction 15; each of the expanses 184, 186 may be independently attached to the cushions 40, 42. An "expanse" simply refers to a member capable of attachment to two cushions to transmit tension between the cushions.

The expanses 184, 186 may be sufficient to transmit tension between the cushions 140, 142. However, the expanses 184, 186 may be connected to enhance protection against occupant excursion by ensuring that no body part is able to fit between the expanses 184, 186. Thus, the expanses 184, 186 may be connected by a flexible central portion 188 extending transversely from the first expanse 184 to the second expanse 186. The flexible central portion 188 need not transmit tension, but may simply act as a barrier to occupant motion out of the vehicle when deployed.

Preferably, the flexible central portion 188 is compatible so that the expanses 184, 186 can be drawn closer together for attachment to the compacted cushions 140, 142. Thus, the flexible central portion 188 may be constructed of a flexible material such as a fabric, standard tether webbing material, fiber or polymer rope, or the like. In the alternative, the flexible central portion 188 may be constructed of a plurality of stiffer segments movably connected together; the central portion 188 may thus be formed of a chain link material or the like. As shown in FIG. 3, the flexible central portion 188 is constructed of a webbing material, like that used to form many seat belts. The flexible central portion 188 may have preformed folds or rolls, if desired, to make compaction of the central portion 188 easier.

The first expanse 184 may be attached to the first cushion 140 at a first position 190 proximate the interior longitudinal edge 164 of the first cushion 140, and to the second cushion 142 at a second position 192 proximate the interior longitudinal edge 164 of the second cushion 142. Similarly, the second expanse 186 may be attached to the first cushion 140 at a third position 194 and to the second cushion 142 at a fourth position 196.

The first, second, third, and fourth positions 190, 192, 194, 196 may simply refer to locations on the cushions 40, 42. Alternatively, the first, second, third, and fourth positions 190, 192, 194, 196 may comprise some mechanism configured to facilitate attachment of the first and second cushions 140, 142 to the tension coupling 144 after the cushions 140, 142 have been folded. For example, the positions 190, 192, 194, 196 may each take the form of a tab 190, 192, 194, 196 protruding from the interior longitudinal edges 164 of the cushions 140, 142 toward the tension coupling 144.

The tabs 190, 192, 194, 196 may be formed integrally with the interior longitudinal edges 164, or may be formed separately and attached to the interior longitudinal edges 164 by some known attachment method. For example, the tabs 190, 192, 194, 196 may be attached to the interior longitudinal edges 164 by sewing, thermal, RF, or ultrasonic welding, chemical or adhesive bonding, and/or mechanical fastening. The tabs 190, 192, 194, 196 may be affixed to the outside of the cushions 140, 142, or may be inserted between symmetrical sheets of the cushions 140, 142 and attached with the same process used to form the peripheral seams 68.

The tabs 190, 192, 194, 196 may be positioned to extend from the interior longitudinal edges 164 of the cushions 140, 142 after the cushions 140, 142 are compacted. The tabs 190, 192, 194, 196 may be sized such that they are exposed after compaction. Thus, the length of the tabs 190, 192, 194, 196 may be determined by the evenness of the compaction and the angle at which the cushions 140, 142 are compacted. The cushions 140, 142 may, for example, be compacted directly in the transverse direction 15, so that the top and bottom edges 60, 62 of each of the cushions 140, 142 will remain substantially straight after compaction. In such a case, each of the interior longitudinal edges 164 may fold directly on top of itself, and the tabs 190, 192, 194, 196 may protrude directly in the longitudinal direction 13.

The first and second expanses 184, 186 may be attached to the tabs 190, 192, 194, 196 through the use of a first attachment mechanism 198, a second attachment mechanism 200, a third attachment mechanism 202, and a fourth attachment mechanism 204, respectively. The attachment mechanisms 198, 200, 202, 204 may utilize any known method or combination of attachment methods. For example, the attachment mechanisms 198, 200, 202, 204 may utilize sewing, thermal, RF, or ultrasonic welding, chemical or adhesive bonding, and/or mechanical fastening. Thus, the attachment mechanisms 198, 200, 202, 204 may each consist of a sewn interface, a welded interface, a bonded interface, and/or any mechanical fastener or fasteners.

A sewn interface may simply consist of a thread, cord, twine, or other flexible member inserted in alternating fashion through one of the tabs 190, 192, 194, 196 and through the corresponding portion of the first or second expanse 184, 186. An RF welded interface may be formed by forming or coating the tabs 190, 192, 194, 196 and the corresponding portions of the first and second expanses 184, 186 with a urethane-based material, or a material with a comparatively high urethane content. An ultrasonic welded interface may similarly be formed by forming or coating the tabs 190, 192, 194, 196 and the corresponding portions of the first and second expanses 184, 186 with an ultrasonic weldable polymer, such as a polypropylene based material.

A bonded interface may be formed by coating the tabs 190, 192, 194, 196 and the corresponding portions of the first and second expanses 184, 186 with an adhesive, cement, or other bondable chemical. Mechanical fasteners may include any solid object that can be used in conjunction with the tabs 190, 192, 194, 196 and the corresponding portions of the first and second expanses 184, 186 to provide attachment. "Rigid mechanical fasteners" include clamps, snaps, hooks, locking rings, screws, bolts, nuts, rivets, tacks, and the like.

In the exemplary configuration of FIG. 3, all of the attachment mechanisms 198, 200, 202, 204 take the form of locking rings 198, 200, 202, 204. The tabs 190, 192, 194, 196 may thus each have a hole (not visible in FIG. 3), each of which is designed to align with a corresponding hole (also not visible in FIG. 3) of the first and second expanses 184, 186. The attachment of the locking rings 198, 200, 202, 204 will be depicted in greater detail in FIG. 4.

Figure 4:
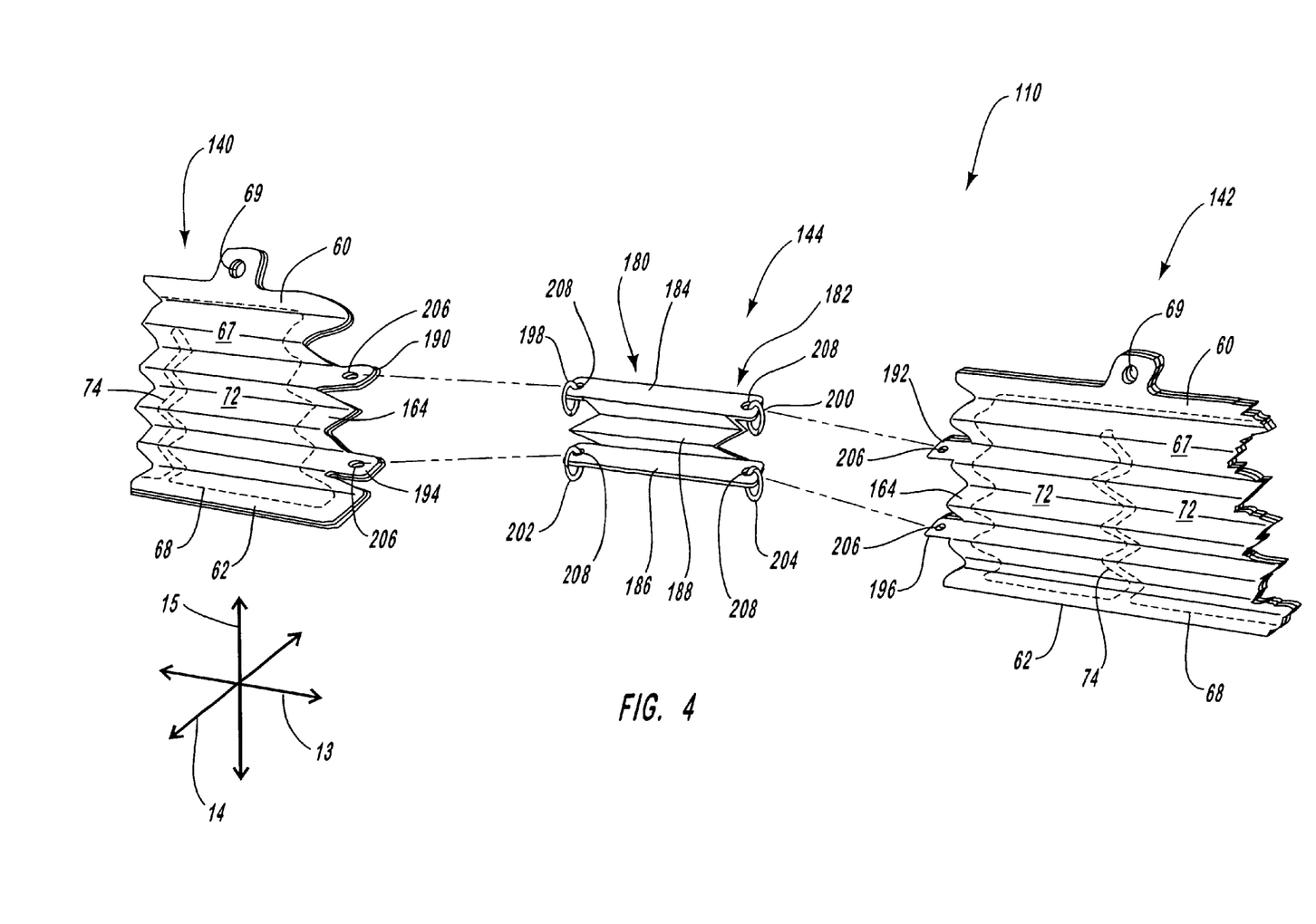
FIG. 4 is a perspective view of the inflatable curtain module of FIG. 3, depicting one possible method of attaching the accordion-folded tension coupling to the cushions after accordion type folding of the cushions.

Referring to FIG. 4, a perspective view of one manner of attaching the tension coupling 144 to the cushions 140, 142 is depicted. The cushions 140, 142 may be fully compacted prior to attachment of the tension coupling 144; nevertheless, the cushions 140, 142 are shown in a partially compacted state for clarity. As shown, the cushions 140, 142 have been compacted with an accordion type fold. The tension coupling 144 has been folded with a corresponding accordion type fold.

The folds of the tension coupling 144 may align with those of the cushions 140, 142 as shown. Thus, the number of folds between the first and third tabs 190, 194 may be equal to the number of folds between the second and fourth tabs 192, 196, as well as the number of folds between the first and second expanses 184, 186. Alternatively, the folds need not align directly. For example, the tension coupling 144 may have larger or smaller folds than the first and second cushions 140, 142. The relative scale of the cushions 140, 142 and the tension coupling 144 need not be as shown in FIG. 4; indeed, the dimensions of the various parts of the inflatable curtain module 110 may be adapted to suit the vehicle to which they are to be applied.

As mentioned previously, the tabs 190, 192, 194, 196 may each have a hole 206 configured to receive one of the locking rings 198, 200, 202, 204. Each of the expanses 184, 186 may have two tabs 208, one proximate the first end 180 of the tension coupling 144, and the other proximate the second end 182. The locking rings 198, 200, 202, 204 may, for example, be disposed through the holes in the tabs 208.

The locking rings 198, 200, 202, 204 may be open prior to attachment. The cushions 140, 142 may be brought together so that the tabs 190, 192, 194, 196 of the cushions 140, 142 are in alignment with the tabs 208 of the tension coupling 144. Each of the locking rings 198, 200, 202, 204 may be inserted through a hole 208 in one of the tabs 190, 192, 194, 196, and through the corresponding hole in the first expanse 184 or the second expanse 186. Then, each of the locking rings 198, 200, 202, 204 may be closed to prevent accidental disengagement from the tabs 190, 192, 194, 196 or expanses 184, 186. The locking rings 198, 200, 202, 204 may each be designed to snap shut in a permanent or reversible fashion. Alternatively, each of the locking rings 198, 200, 202, 204 may be welded, bonded, pressed, or otherwise closed.

After the tension coupling 144 has been attached to the cushions 140, 142, the inflatable curtain module 110 may be installed in the vehicle 12. The attachment tabs 69 of both cushions 140, 142 may be attached to one of the roof rails 36, as mentioned previously. The cushions 140, 142 may be spaced apart in the longitudinal direction 13 so that the tension coupling 144 is disposed substantially at its full length between the cushions 140, 142.

Due to the use of the accordion style compaction, the cushions 140, 142 and the tension coupling 144 may deploy in the form of a substantially straight extension as the cushions 140, 142 fill with air. Thus, upon deployment of the cushions 140, 142, the tension coupling 144 deploys into an expanded position in which it is stretched comparatively tightly between the cushions 140, 142. The tension coupling 144 may effectively convey tension between the cushions 140, 142 after deployment of the module 110 to help keep the cushions 140, 142 in place.

Accordion type folding is only one example of compaction methods that may be used to compact cushions and a flexible tension member. Other methods, most notably rolling, may also be used, either exclusively or in combination with folding. Such methods are depicted in greater detail in FIGS. 5 through 6.

Figure 5:
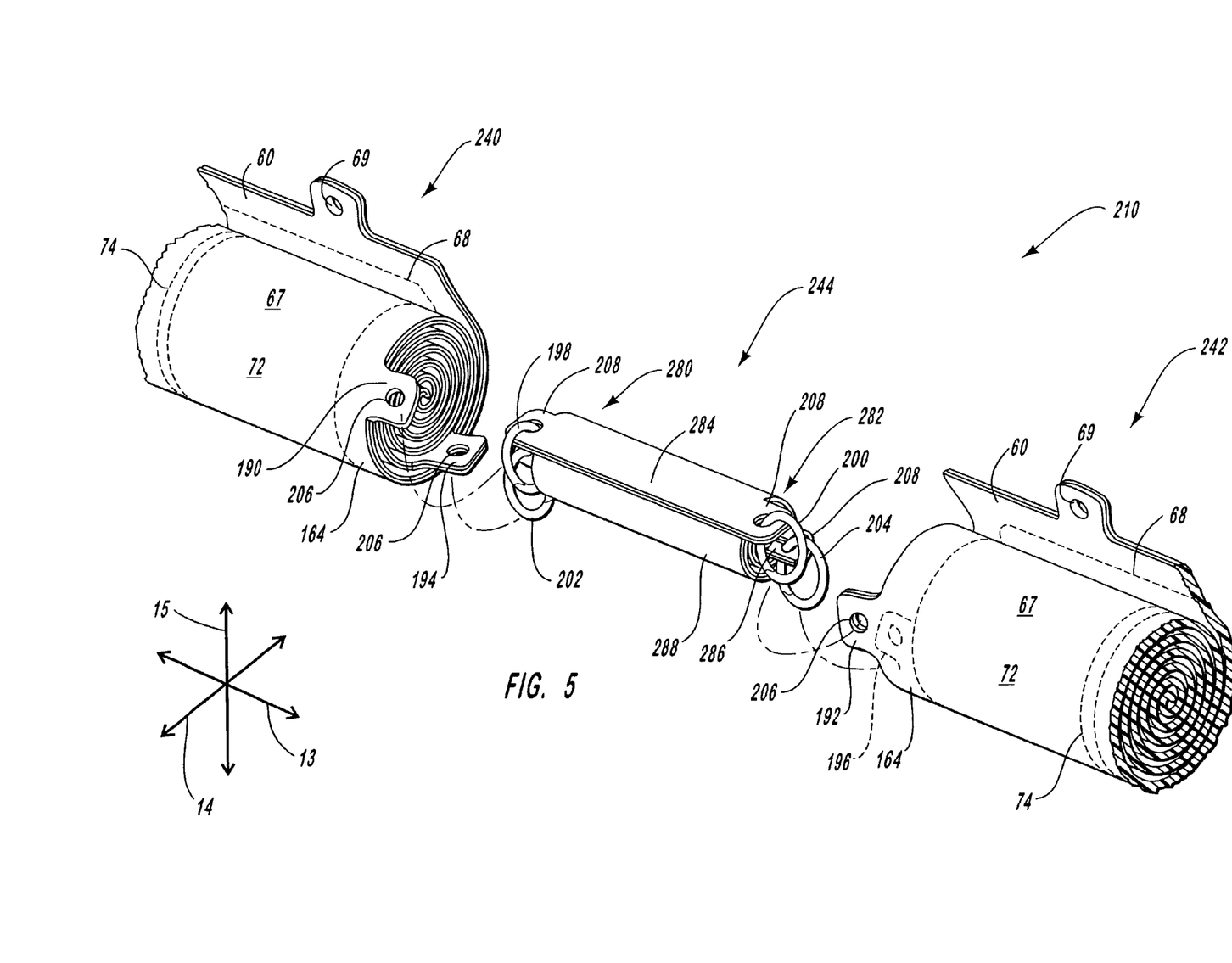
FIG. 5 is a perspective view of another alternative embodiment of an inflatable curtain module according to the invention, depicting a method of attaching a rolled tension coupling to the cushions after rolling the cushions.

Referring to FIG. 5, an alternative embodiment of an inflatable curtain module 210 is depicted. The inflatable curtain module 210 may have a first cushion 240 and a second cushion 242. The cushions 240, 242 may be similar to the cushions 140, 142 of FIGS. 3 and 4, with the exception that the cushions 240, 242 are to be compacted by rolling rather than accordion folding. The tabs 190, 192, 194, 196 of the cushions 240, 242 may extend longitudinally from the interior longitudinal edges 164 of the cushions 240, 242 in much the same fashion as with the cushions 140, 142.

The inflatable curtain module 210 may also have a tension coupling 244 similar to the tension coupling 144 of FIGS. 3 and 4, except that the tension coupling 244 is to be compacted through rolling. The tension coupling 244 may thus have a first end 280 oriented toward the first cushion 240 and a second end 282 oriented toward the second cushion 242. A first expanse 284 and a second expanse 286 may extend between the first and second ends 280, 282.

The expanses 284, 286 may be connected by a flexible central portion 288. The flexible central portion 288 may be compacted in a manner similar to the cushions 240, 242. Thus, the flexible central portion 288 may be rolled, and may even be rolled in the same direction, and with the same number of rolls, as the portions of the cushions 240, 242 between the first and third tabs 190, 194 and the second and fourth tabs 192, 196. With such a configuration, the tension coupling 244 will be substantially flat when the cushions 240, 242 have deployed. However, the number of rolls used need not be the same because the tension coupling 244 may effectively transmit tension between the cushions 240, 242 even if it is fully or partially rolled or twisted in its fully deployed state.

Figure 6:
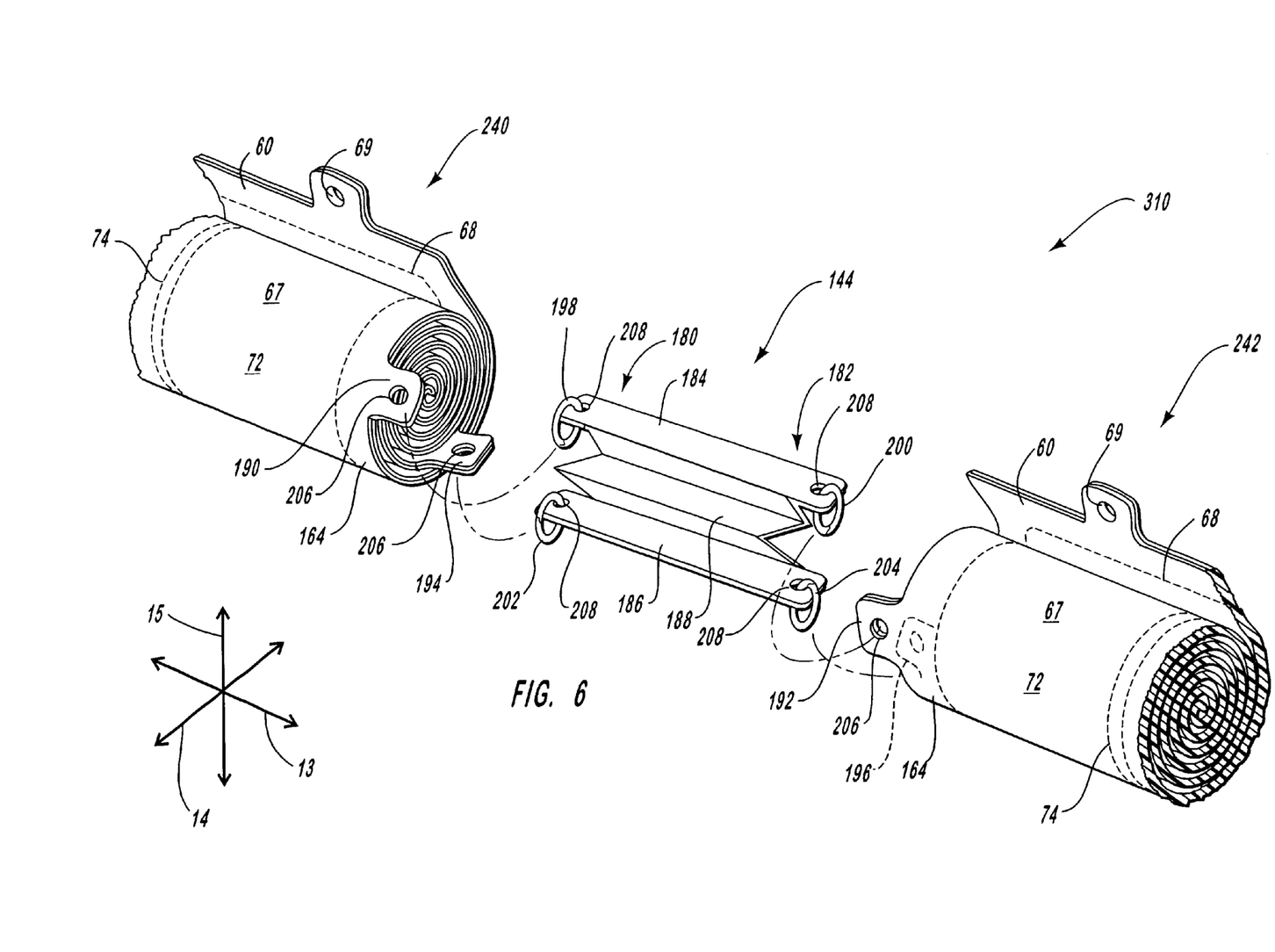
FIG. 6 is a perspective view of another alternative embodiment of an inflatable curtain module according to the invention, depicting a method of attaching an accordion-folded tension coupling to the cushions after rolling the cushions.

Referring to FIG. 6, an alternative embodiment of an inflatable curtain module 310 is depicted. The inflatable curtain module 310 may utilize a combination of compaction methods. For example, the cushions 240, 242 may be substantially as shown and described in connection with FIG. 5, and may thus be compacted through rolling. The tension coupling 144 may be substantially as shown and described in connection with FIGS. 3 and 4, and may be compacted through accordion type folding. The attachment mechanisms 198, 200, 202, 204 of the tension coupling 144 may be attached to the tabs 190, 192, 194, 196 of the cushions 240, 242 in substantially the same manner as with the embodiments of FIGS. 3 through 5.

As the cushions 240, 242 unroll during deployment, the first and third tabs 190, 194 as well as the second and fourth tabs 192, 196 can be expected to rotate with respect to each other, thereby rotating the first and second expanses 184, 186 with respect to each other. Such rotation may be expected to induce the tension coupling 144 to deploy in a rolled state. As mentioned in connection with the embodiment of FIG. 5, the tension coupling 144 may still operate to transmit tension between the cushions 240, 242 in a fully or partially rolled, folded, or twisted state. However, such folding, rolling, or twisting may decrease the area of the barrier to occupant excursion provided by the tension coupling 144.

Many other combinations of compaction types may be used. For example, cushions that have been compacted by accordion type folding may be connected by a tension coupling that has been compacted through rolling. Alternatively, cushions that have been compacted in different ways may be used within the same inflatable curtain module. Those of skill in the art will recognize that other compaction types may be utilized within the scope of the invention.

A tension coupling may also be attached to cushions in a wide variety of ways that permit attachment of the flexible coupling to the cushions after folding without requiring the tabs 190, 192, 194, 196 of FIGS. 3 through 6. Attachment methods such as sewing, conventional or one-piece weaving, thermal, RF, or ultrasonic welding, chemical or adhesive bonding, and mechanical fastening may be used. One exemplary inflatable curtain module in which a tension coupling is attached to cushions without the use of tabs will be shown and described in greater detail in connection with FIGS. 7 and 8.

Figure 7:
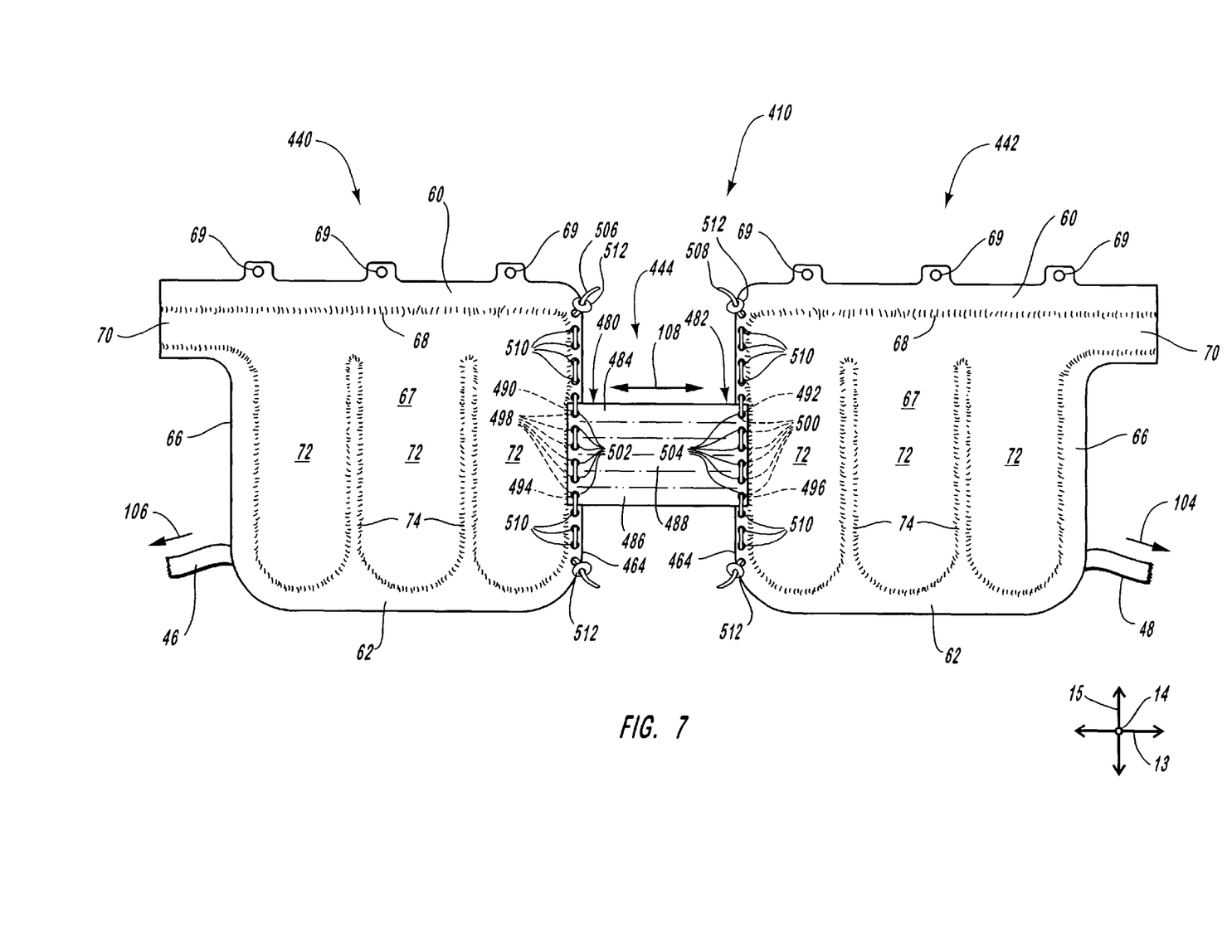
FIG. 7 is a side elevation view of yet another alternative embodiment of an inflatable curtain module according to the invention, with a tension coupling attached to each cushion through the use of aligned arrays of holes in the cushions and in the tension coupling.

Referring to FIG. 7, a side view of yet another alternative embodiment of an inflatable curtain module 410 is depicted. The inflatable curtain module 410 may have a first cushion 440, a second cushion 442, and a tension coupling 444. The cushions 440, 442 may be configured in a manner similar to the cushions 40, 42, 140, 142, 240, 242 described previously, with the exception of the interior longitudinal edges 464, the configuration of which will be described in greater detail subsequently.

The tension coupling 444 may have a first end 480 designed to be attached to the first cushion 440 and a second end 482 designed to be attached to the second cushion 442. The tension coupling 444 may have a first expanse 484 and a second expanse 486, each of which extends from the first end 480 to the second end 482. The expanses 484, 486 may be connected in the transverse direction 15 by a flexible central portion 488 configured to be compacted so that the expanses 484, 486 can be brought closer together.

The first expanse 486 may be attached to a first position 490 on or near the interior longitudinal edge 464 of the first cushion 440 and to a second position 492 on or near the interior longitudinal edge 464 of the second cushion 442. Similarly, the second expanse 488 may be attached to a third position 494 on or near the interior longitudinal edge 464 of the first cushion 440 and to a fourth position 496 on or near the interior longitudinal edge 464 of the second cushion 442. The first, second, third, and fourth positions 490, 492, 494, 496 may take the form of a first hole 490, second hole 492, third hole 494, and a fourth hole 496, respectively.

Furthermore, additional holes may be formed between the first and third holes 490, 494 to create a first array of cushion holes 498 in conjunction with the first and third holes 490, 494. Similarly, additional holes may be formed between the second and fourth holes 492, 496 to create a second array of cushion holes 500 in conjunction with the second and fourth holes 492, 496.

A corresponding first array of coupling holes 502 may be formed in the first end 480 of the tension coupling 444, and a corresponding second array of coupling holes 504 may be formed in the second end 482 of the tension coupling 444. More specifically, the holes of the first array of coupling holes 502 may be spaced apart to align with the holes of the first array of cushion holes 498. Similarly, the holes of the second array of coupling holes 504 may be spaced apart to align with the holes of the second array of cushion holes 500.

If desired, the tension coupling 444 may be attached to the cushions 440, 442 before the cushions 440, 442 are folded. According to one method, the cushions 440, 442 may first be laid side-by-side, separated by the appropriate distance. The tension coupling 444 may then be laid between the cushions 440, 442 in such a manner that the first and second ends 480, 482 overlap the interior longitudinal edges 464 of the first and second cushions 440, 442, respectively. More specifically, the tension coupling 444 may be positioned such that the holes of the fist and second arrays of coupling holes 502, 504 align with and lie on top of the holes of the first and second arrays of cushion holes 498, 500.

The tension coupling 444 may then be attached to the cushions 440, 442 by applying a first attachment mechanism 506 to the first array of cushion holes 498 and the first array of coupling holes 502, and by applying a second attachment mechanism 508 to the second array of cushion holes 500 and to the second array of cushion holes 504. As with the attachment mechanisms 198, 200, 202, 204, the attachment mechanisms 506, 508 may utilize any known method or combination of attachment methods. For example, the attachment mechanisms 506, 508 may utilize sewing, thermal, RF, or ultrasonic welding, chemical or adhesive bonding, and/or mechanical fastening. Thus, the attachment mechanisms 506, 508 may each consist of a sewn interface, a welded interface, a bonded interface, and/or any mechanical fastener or fasteners.

Each of the attachment mechanisms 506, 508 may utilize lacing, which may be categorized as a form of sewing. Thus, as depicted in FIG. 7, the attachment mechanisms 506, 508 may take the form of a first lace 506 and a second lace 508. The first lace 506 may be inserted in interlocking fashion through the first array of cushion holes 498 and the first array of coupling holes 502. Similarly, the second lace 508 may be inserted in interlocking fashion through the second array of cushion holes 502 and the second array of coupling holes 504.

The first and second cushions 440, 442 may each have extra holes 510 displaced from the first and second arrays of cushion holes 498, 500 in the transverse direction 15. The extra holes 510 may facilitate installation of the laces 506, 508 in the cushions 440, 442.

When the laces 506, 508 are in place, they may, if desired, be restrained by stoppers 512 positioned at either end of each of the laces 506, 508. The stoppers 512 may take a variety of forms. In FIG. 7, the stoppers 512 take the form of locking clamps 512 larger than the arrays of cushion and coupling holes 498, 500, 502, 504 and the extra holes 510. The locking clamps 512 may be configured to grip the laces 506, 508 when activated to ensure that the laces 506, 508 do not slide out of the arrays of cushion and coupling holes 498, 500, 502, 504 and the extra holes 510.

The tension coupling 444 may also be attached to the cushions 440, 442 after the cushions 440, 442 have been compacted. One method of applying the laces 506, 508 to the cushions 440, 442 and the tension coupling 444 after compaction of the cushions 440, 442 will be shown and described in greater detail in connection with FIG. 8.

Figure 8:
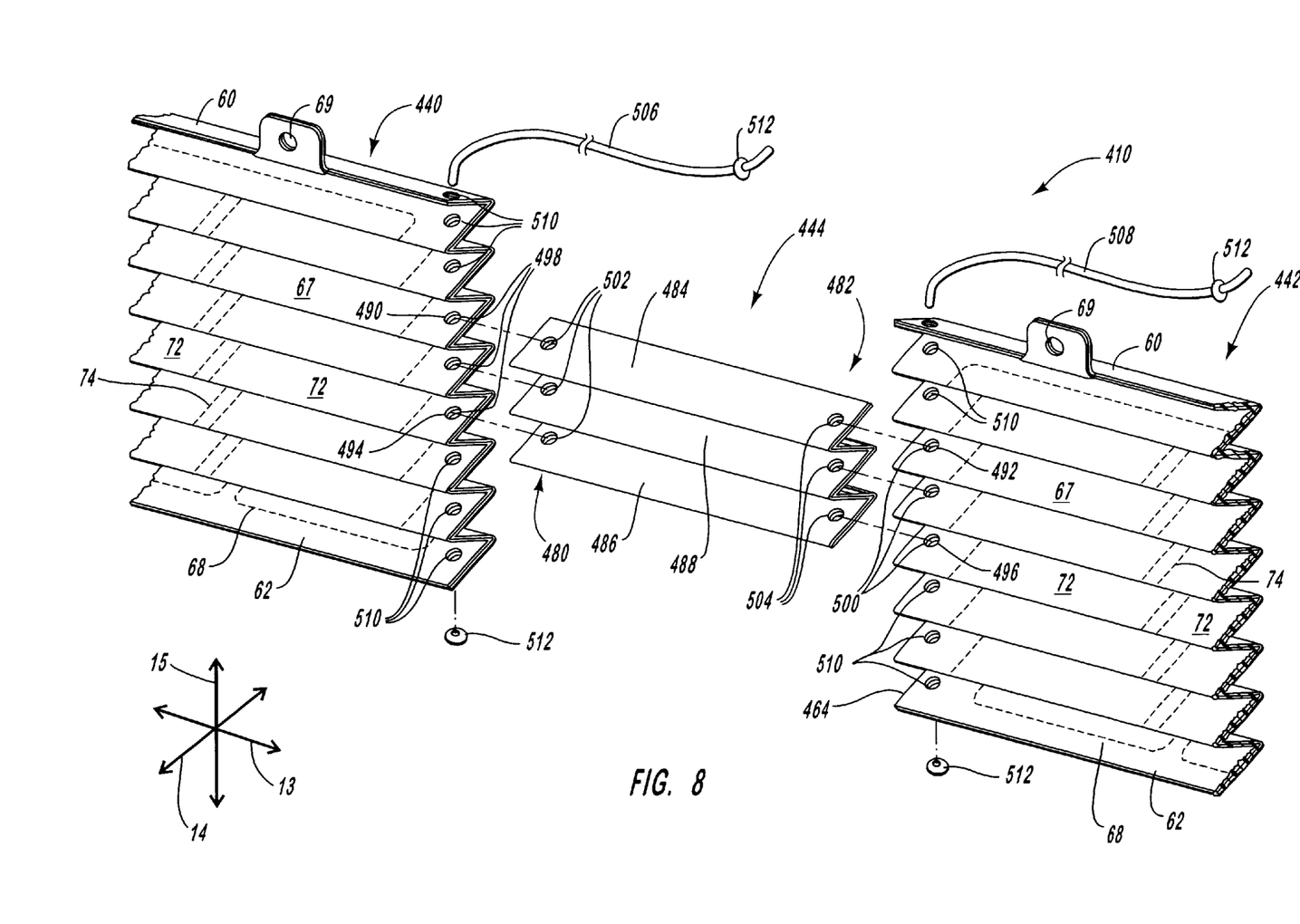
FIG. 8 is a perspective view of the inflatable curtain module of FIG. 7, depicting one possible method of attaching the accordion-folded tension coupling to the cushions after accordion type folding of the cushions, through the use of the arrays of holes.

Referring to FIG. 8, a perspective view of the inflatable cushion module 410 is shown. As with the embodiment of FIG. 4, the cushions 440, 442 have been compacted by accordion type folding; the cushions 440, 442 are shown in a partially folded state for clarity. The tension coupling 444 is also shown in a partially accordion folded state.

After the cushions 440, 442 have been compacted, the interior longitudinal edges 464 of the cushions 440, 442 will be folded in an accordion type fold, with a zig-zag folding pattern. The tension coupling 444 may be compacted with a similar pattern, with folds that correspond to the folds of the cushions 440, 442. The first and second ends 480, 482 of the tension coupling 444 may thus be inserted into the folded longitudinal edges 464 such that the folds of the interior longitudinal edges 464 and the first and second ends 480, 482 are interleaved.

The holes of the arrays of cushion and coupling holes 498, 500, 502, 504 and the extra holes 510 may be spaced apart such that one hole is disposed at the center of each fold. Consequently, the holes of the arrays 498, 500, 502, 504 and the extra holes 510 may substantially line up with each other when the cushions 440, 442 and the tension coupling 444 are compacted.

If desired, the holes of the arrays 498, 500, 502, 504 and the extra holes 510 may be formed after the cushions 440, 442 have been compacted, and may even be formed after the first and second ends 480, 482 have been meshed with the interior longitudinal edges 464. For example, a punching operation, a drilling operation, a cutting operation, or the like may be applied in the transverse direction 15 to simultaneously form the holes of the first array of cushion holes 498, the first array of coupling holes 502, and the extra holes 510 of the first cushion 440. A similar operation may be used to simultaneously form the holes of the second array of cushion holes 500, the second array of coupling holes 504, and the extra holes 510 of the second cushion 442.

After the holes of the arrays 498, 500, 502, 504 and the extra holes 510 have been provided and aligned, the laces 506, 508 may be used to fix the tension coupling 444 in position with respect to the cushions 440, 442. More specifically, the first lace 506 may be inserted through the holes of the first array of cushion holes 498, the first array of coupling holes 502, and the extra holes 510 of the first cushion 440. The second lace 508 may be inserted through the holes of the second array of cushion holes 500, the second array of coupling holes 504, and the extra holes 510 of the second cushion 440.

Each of the laces 506, 508 may have a locking clamp 512 affixed prior to installation of the laces 506, 508 in the cushions 440, 442 and the tension coupling 444. After insertion of the laces 506, 508, another locking clamp 512 may be attached to each of the laces 506, 508 to prevent the laces 506, 508 from slipping out of the holes of the arrays 498, 500, 502, 504 and the extra holes 510. The locking clamps 512 may be positioned to provide substantial slack in the laces 506, 508 to accommodate unfolding of the cushions 440, 442.

When the cushions 440, 442 deploy, the tension coupling 444 may simply unfold together with the cushions 440, 442. The inflatable curtain module 410 may thus resemble the configuration of FIG. 7 after inflation. The tension coupling 444 may operate to transmit tension between the cushions 440, 442 in much the same fashion as those of the embodiments described previously. The tension coupling 444 may also serve as a barrier to occupant excursion, as described in connection with previous embodiments.

The methods and apparatus of the present invention may enhance the protective capability, interchangeability, flexibility, and economy of inflatable curtain modules. According to certain embodiments of the invention, cushions for inflatable curtain modules may be individually manufactured and folded. The cushions may even be shipped to automobile manufacturers in a folded condition, and installed relatively easily through the simple attachment of tension coupling. Thus, inflatable curtains may be utilized in a greater number of vehicles, with a comparatively small addition to the overall cost of the vehicle.

Furthermore, through the use of tension couplings, vehicle occupants may be more effectively protected against side impact, due to the fact that the cushions are more firmly restrained through the creation of a complete tension path extending through multiple cushions. Moreover, vehicle occupants may be more effectively protected against excursion from the vehicle during rollovers by the barrier provided by the tension coupling.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflatable curtain module for protecting one or more occupants of a vehicle from lateral impact, the inflatable curtain module comprising:
    a first cushion having a protection zone;
    a second cushion having a protection zone; and
    a tension coupling having a first end attachable to the first cushion by a first attachment mechanism and a second end attachable to the second cushion by a second attachment mechanism, wherein the tension coupling is configured to transmit tension between the first cushion and the second cushion to keep the protection zones of the first and second cushions in a position suitable for protecting one or more occupants of the vehicle;
        wherein the first cushion comprises holes configured to align with holes formed in the first end of the tension coupling, and wherein the second cushion comprises holes configured to align with holes formed in the second end of the tension coupling.

2. The inflatable curtain module of claim 1, wherein the first and second cushions each comprise a longitudinal edge, and wherein the tension coupling is sewn to the longitudinal edges of the first and second cushions.

3. The inflatable curtain module of claim 1, wherein the first cushion comprises a first tab extending outward from the protection zone of the first cushion, the second cushion comprising a second tab extending outward from the protection zone of the second cushion, wherein the first and second tabs are configured to receive the first and second attachment mechanisms, respectively.

4. The inflatable curtain module of claim 3, wherein the first and second attachment mechanisms each comprise a rigid mechanical fastener affixed to the tabs and to the tension coupling.

5. The inflatable curtain module of claim 4, wherein the first and second attachment mechanisms are selected from the group consisting of clamps, snaps, hooks, locking rings, screws, bolts, nuts, rivets, and tacks.

6. The inflatable curtain module of claim 3, wherein the first and second attachment mechanisms each comprise a sewn interface between the tabs and the tension coupling.

7. The inflatable curtain module of claim 3, wherein the first and second attachment mechanisms each comprise a welded interface between the tabs and the tension coupling.

8. The inflatable curtain module of claim 7, wherein the welded interface of the first and second attachment mechanisms are created through the application of ultrasonic energy.

9. The inflatable curtain module of claim 3, wherein the first cushion further comprises:
    a top edge configured to be fastened to the vehicle;
    a bottom edge configured to be moved toward the top edge by a compaction process selected from the group consisting of rolling and accordion style folding; and
    a longitudinal edge extending between the top edge and the bottom edge, wherein the first tab is attached to the longitudinal edge such that the first tab will be exposed after compaction of the cushion to permit attachment of the first end of the coupling to the tab after compaction of the cushion.

10. The inflatable curtain module of claim 1, wherein the holes of the first cushion comprise a first array of cushion holes, the holes of the second cushion comprise a second array of cushion holes, the holes of the first end of the tension coupling comprise a first array of coupling holes, and the holes of the second end of the tension coupling comprise a second array of coupling holes, wherein the first array of cushion holes are configured to align with the first array of coupling holes and the second array of cushion holes is configured to align with the second array of coupling holes.

11. The inflatable curtain module of claim 10, wherein the first attachment mechanism comprises a first rigid mechanical fastener inserted through one or more of the first array of cushion holes and the first array of coupling holes, and wherein the second attachment mechanism comprises a second rigid mechanical fastener inserted through one or more of the second array of cushion holes and the second array of coupling holes.

12. The inflatable curtain module of claim 11, wherein the first and second attachment mechanisms are each selected from the group consisting of clamps, snaps, hooks, locking rings, screws, bolts, nuts, rivets, and tacks.

13. The inflatable curtain module of claim 10, wherein the first attachment mechanism comprises a first lace inserted in interlocking fashion through the first array of cushion holes and the first array of coupling holes, and wherein the second attachment mechanism comprises a second lace inserted in interlocking fashion through the second array of cushion holes and the second array of coupling holes.

14. The inflatable curtain module of claim 10, wherein the first cushion further comprises:
 a top edge configured to be fastened to the vehicle;
 a bottom edge configured to be moved toward the top edge by a compaction process selected from the group consisting of rolling and accordion style folding; and
 a longitudinal edge extending between the top edge and the bottom edge, wherein the first array of cushion holes is arrayed along a length of the longitudinal edge.

15. The inflatable curtain module of claim 1, wherein the tension coupling further comprises:
 a first expanse extending from the first end to the second end, wherein the first expanse is attachable to a first position in relation to the longitudinal edge of the first cushion by the first attachment mechanism, and to a second position in relation to the longitudinal edge of the second cushion by the second attachment mechanism;
 a second expanse offset from the first expanse, the second expanse extending from the first end to the second end, wherein the second expanse is attachable to a third position in relation to the longitudinal edge of the first cushion by a third attachment mechanism, and to a fourth position in relation to the longitudinal edge of the second cushion by a fourth attachment mechanism; and
 a flexible central portion connecting the first and second expanses, wherein the flexible central portion is compactible to permit the first and third attachment mechanisms to be moved toward each other and the second and fourth attachment mechanisms to be moved toward each other so that the tension coupling can be connected to the first and second cushions after the first and second cushions are compacted.

16. A cushion for an inflatable curtain module for protecting one or more occupants of a vehicle from lateral impact, the cushion comprising:
 a top edge configured to be attached to the vehicle;
 a bottom edge configured to be drawn toward the top edge by a compaction process selected from the group consisting of rolling and accordion style folding;
 a protection zone between the top edge and the bottom edge, the protection zone being configured to contain a pressurized gas;
 an interior longitudinal edge extending between the top edge and the bottom edge; and
 a first tab attached to the interior longitudinal edge to protrude away from the protection zone such that the first tab will be exposed after compaction of the cushion, wherein the first tab comprises an attachment structure for connecting the first tab to a complimentary attachment structure associated with a tension coupling disposed between the cushion and an adjacent cushion to transmit tension to the protection zone from the adjacent cushion and from the protection zone to the adjacent cushion.

17. The cushion of claim 16, wherein the tab is formed integrally with the longitudinal edge from a fabric material.

18. The cushion of claim 16, wherein the tab is substantially formed of an ultrasonic weldable material.

19. The cushion of claim 16, wherein the tab is substantially coated with an ultrasonic weldable material.

20. The cushion of claim 16, wherein the tab comprises a hole configured to receive a rigid mechanical fastener.

21. The cushion of claim 16, wherein the longitudinal edge further comprises a second tab displaced along the longitudinal edge from the first tab.

22. A cushion for an inflatable curtain module for protecting one or more occupants of a vehicle from lateral impact, the cushion comprising:
 a top edge configured to be attached to the vehicle;
 a bottom edge configured to be drawn toward the top edge by a compaction process selected from the group consisting of rolling and accordion style folding;
 a protection zone between the top edge and the bottom edge, the protection zone being configured to contain a pressurized gas; and
 a longitudinal edge extending between the top edge and the bottom edge, the longitudinal edge having a plurality of cushion holes arrayed along a length of the longitudinal edge, wherein the holes are spaced apart to align with a plurality of coupling holes of a tension coupling such that an attachment mechanism can be inserted through the holes of the cushion and the tension coupling.

23. The cushion of claim 22, wherein the plurality of cushion holes are spaced apart such that accordion style folding of the cushion substantially aligns the plurality of cushion holes with each other so that the attachment mechanism can be inserted through all of the plurality of cushion holes by moving the attachment mechanism in a single direction.

24. The cushion of claim 22, wherein the plurality of cushion holes are substantially sealed from the protection zone to avoid escape of pressurized gas through the plurality of cushion holes.

25. A tension coupling having a first end configured to be attached to a longitudinal edge of a first cushion and a second end configured to be attached to a longitudinal edge of a second cushion to transmit tension between the first and second cushions, the tension coupling comprising:
 a first expanse extending from the first end to the second end, wherein the first expanse is configured to be attached to a first position in relation to the longitudinal edge of the first cushion and to a second position in relation to the longitudinal edge of the second cushion;
 a second expanse offset from the first expanse, the second expanse extending from the first end to the second end, wherein the second expanse is configured to be attached to a third position in relation to the longitudinal edge of the first cushion and to a fourth position in relation to the longitudinal edge of the second cushion; and
 a flexible central portion connecting the first and second expanses to permit the first and second expanses to move compactly toward each other so that the tension coupling can be connected to the first and second cushions after the first and second cushions are compacted.

26. The tension coupling of claim 25, wherein the flexible central portion is configured to be rolled.

27. The tension coupling of claim 26, wherein the flexible central portion is configured to be rolled with a number of rolls equal to a number of rolls between the first and third positions of the first cushion and between the second and fourth positions of the second cushion.

28. The tension coupling of claim 25, wherein the flexible central portion is configured to be accordion folded.

29. The tension coupling of claim 28, wherein the flexible central portion is configured to be accordion folded with a number of folds equal to a number of folds between the first and third positions of the first cushion and between the second and fourth positions of the second cushion.

30. The tension coupling of claim 25, wherein the first and second expanses are configured to be attached to first, second, third, and fourth tabs positioned at the first, second, third, and fourth positions, respectively.

31. The tension coupling of claim 25, further comprising:
   a first array of coupling holes configured to be held in alignment with a first array of cushion holes formed in the longitudinal edge of the first cushion by a first attachment mechanism; and
   a second array of coupling holes configured to be held in alignment with a second array of cushion holes formed in the longitudinal edge of the second cushion by a second attachment mechanism.

32. An inflatable curtain module for protecting one or more occupants of a vehicle from lateral impact, the inflatable curtain module comprising:

a first cushion having a protection zone;

a second cushion having a protection zone; and a tension coupling having a first end attachable to the first cushion by a first attachment mechanism and a second end attachable to the second cushion by a second attachment mechanism, wherein the tension coupling is configures to transmit tension between the first cushion and the second cushion to keep the protection zones of the first and second cushions in a position suitable for protecting one or more occupants of the vehicle;

wherein the first cushion comprises a first tab extending outward from the protection zone of the first cushion, the second cushion comprising a second tab extending outward from the protection zone of the second cushion, wherein the first and second tabs are configured to receive the first and second attachment mechanisms, respectively.

* * * * *